(12) United States Patent
King (10) Patent No.: US 8,190,216 B2
(45) Date of Patent: May 29, 2012

(54) MOBILE PHONE POWER-SAVING BY USAGE LEARNING

(75) Inventor: James King, Wokingham (GB)

(73) Assignee: Broadcom Corporation, Irvine, CA (US)

( * ) Notice: Subject to any disclaimer, the term of this patent is extended or adjusted under 35 U.S.C. 154(b) by 421 days.

(21) Appl. No.: 12/435,496

(22) Filed: May 5, 2009

(65) Prior Publication Data

US 2010/0285848 A1     Nov. 11, 2010

(51) Int. Cl.
*H04B 1/38*     (2006.01)
(52) U.S. Cl. .................. 455/574; 455/90.1; 455/550.1
(58) Field of Classification Search ............... 455/574, 455/90.1, 550.1, 575.3, 556
See application file for complete search history.

(56) References Cited

U.S. PATENT DOCUMENTS

| | | | |
|---|---|---|---|
| 7,346,376 B2* | 3/2008 | Hamamura et al. | 455/575.3 |
| 2005/0024318 A1* | 2/2005 | Ho et al. | 345/102 |
| 2005/0096102 A1* | 5/2005 | Mock et al. | 455/574 |
| 2008/0090616 A1* | 4/2008 | Sutardja | 455/566 |
| 2008/0161071 A1* | 7/2008 | Sherman | 455/574 |

\* cited by examiner

*Primary Examiner* — Jean B Jeanglaude
(74) *Attorney, Agent, or Firm* — Weiss & Arons LLP (57) ABSTRACT

A method for controlling the operation of a mobile phone backlight. The method may include receiving an incoming call. The method may also include receiving a selection from a user in response to receiving the incoming call. The method may include storing information relating to the selection received from the user. The method may further include turning off the mobile phone backlight after the passing of a predetermined time span of user inaction. The passing of the predetermined time span may follow the selection received from the user. The length of the predetermined time span may be determined at least in part using an algorithm. The method may also include modifying the algorithm based at least in part on the stored information.

34 Claims, 7 Drawing Sheets

MOBILE PHONE POWER-SAVING BY USAGE LEARNING

FIELD OF TECHNOLOGY

This invention relates to a power-saving method. More particularly this invention relates to a power-saving method for a mobile phone.

BACKGROUND OF THE INVENTION

Mobile phones are manufactured with power-saving features that are configured to save battery power. Typically, these power-saving features are preprogrammed and do not adjust to an individual user's behavior. This is not desirable at least because a users' behavior, when learned, can provide additional power-saving opportunities.

For example, one exemplary user may rarely execute a selection on his phone following the completion of a call. Yet, a phone with fixed power-saving settings will always maintain the backlight in an on setting following any key activation.

It would therefore be desirable to provide systems and methods for providing mobile phone power-saving features that learn a user's behavior and modify power-saving settings in response to the learned behavior.

SUMMARY OF THE INVENTION

A system and/or method for determining when to modify a mobile phone backlight setting, substantially as shown in and/or described in connection with at least one of the figures, as set forth more completely in the claims.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Systems and methods are provided for modifying a setting of a mobile phone. The setting may be a mobile phone setting that affects the power consumption of the mobile phone. The setting may be modified according to an algorithm.

It should be noted that the systems and methods of the invention that are provided for modifying a setting of a mobile phone may also be implemented on a GPS device setting, MP3 device setting, a memory device setting, a device that combines the functionality of the above-listed device settings, or any other suitable electronic device setting.

The algorithm may modify the mobile phone setting based at least in part on stored information. The stored information may relate to one or more selections executed on the mobile phone. The information stored relating to the one or more selections executed on the mobile phone may be stored in a mobile phone memory.

The information stored relating to the one or more selections executed on the mobile phone may relate to selections executed via a mobile phone button, keypad, touch screen sensor, voice recognition function and/or any other method that allows for data input into the mobile phone. Some examples of selections executed on the mobile phone that may be stored in the mobile phone memory include, but are not limited to, a selection relating to accepting a call, rejecting a call, turning the mobile phone on and/or off, turning the mobile phone speaker on and/or off, moving a mobile phone curser and/or selecting a menu option, icon and/or visual representation. The selection executed on the mobile phone may relate to a mobile phone feature. For example, the mobile phone feature may be a mobile phone camera, video camera, MP3 player, Blue Tooth and/or mobile phone game, application, setting, text, chat, e-mail and/or internet.

It should be noted that the mobile phone may also store information relating to the movement and/or spatial location of the mobile phone. The stored information relating to the movement and/or spatial location of the mobile phone may be used by the algorithm to modify one or more mobile phone settings.

Information relating to the time of day, day of the week, month and/or year that the selection was executed may be stored in the mobile phone memory. In addition, a length of time that elapses before a user responds to an incoming call, message, ring, prompt, or any other stimulus may be stored in the mobile phone memory. Whether the mobile phone was in a roaming state or not when the selection was made may also be stored in the mobile phone memory.

The systems and methods of the invention may also include storing information relating to a time span that follows a selection executed by the user. The time span following the selection executed by the user may be characterized by a period of user inaction with respect to one or more selections that may be executed on the mobile phone. Alternatively, the time span may be characterized by a period of static spatial location and/or orientation of the mobile phone.

The mobile phone may store in a mobile phone memory information relating to two or more of the aforementioned mobile phone inputs. The algorithm may modify the mobile phone setting based at least in part on some or all of the stored information. It should be noted that a first type of stored information may affect the modification of the mobile phone setting differently than a second type of stored information. It should additionally be noted that information relating to a first combination of user inputs may affect the mobile phone setting differently from information relating to a second combination of user inputs.

The systems and methods of the invention may include learning at least some of the user's behavior during a mobile phone settings modification process. The mobile phone may store the user's responses to tasks, prompts and/or options to determine partially or fully a modification to be implemented on one or more mobile phone settings. In certain embodiments of the invention, the modification performed during the settings modification process may be further modified as long as the user continues to use the mobile phone.

An algorithm used by the systems and methods of the invention may modify a mobile phone setting based at least in part on information stored in the mobile phone memory. At least some of the stored data used by the algorithm to modify the mobile phone setting may relate to one or more selections executed on the mobile phone.

One example of a method according to the invention is as follows. An exemplary user rarely uses the touch screen sensor of his mobile phone when a phone call is in progress. Consequently, information may be stored in the mobile phone memory relating to one or more periods of user inaction with respect to the touch screen sensor when a call is in progress. Upon determining a suitable parameter and/or threshold value representing the user tendency not to use the touch screen during a phone call, the algorithm may modify the touch screen sensor setting of the mobile phone by turning off the touch screen sensor when a user answers a call, or, alternatively, by reducing the ON-time of the touch screen sensor setting following receipt of an incoming call.

A button to re-enable the touch screen sensor may be displayed for at least some of the time that the touch screen sensor is turned off. Alternatively, the touch screen sensor may turn on upon a user depression of the touch screen. In one embodiment, the touch screen sensor may be turned on via a selection executed on a mobile phone button.

The algorithm used by the systems and methods of the invention may be a learning algorithm. The learning algorithm may modify settings based on newly-received and/or previously stored data. The learning algorithm may use, for example, Bayesian statistics or Gaussian statistics to process stored data. Alternatively, the algorithm may be a probability algorithm that uses uniformly random bits of input to reduce power consumption in the average case of user input.

Any other suitable non-deterministic algorithm may be used by the systems and methods of the invention, the non-deterministic algorithm using at least one external state such as user input, a hardware timer value, a random value and/or stored disk data to determine possible continuums to follow one or more events. The systems and methods of the invention may also include modifying a mobile phone setting via a threshold calculation and/or adjustment.

In the embodiment of an algorithm modifying a mobile phone setting based on information relating to two or more selections, the algorithm may process information relating to a first selection differently than information relating to a second selection.

It should be noted that the systems and methods of the invention may include using one or more algorithms to modify the mobile phone setting. A first algorithm may initiate modification of the mobile phone setting, and a second algorithm may be used to further modify the mobile phone setting upon the occurrence of a predetermined event or events.

It should be noted that in one embodiment of the invention, a mobile phone setting may be partially controlled by the algorithm taught by the systems and methods of the invention and partially controlled by a mobile phone default setting. For example, a mobile phone backlight may always be turned on by a mobile phone default setting and turned off by a learning algorithm.

It should additionally be noted that the algorithm's modification of the default setting may vary with the time of day, day of the week, month, year, and/or spatial location and/or orientation of the mobile phone, whether the mobile phone is roaming and/or any other suitable information. In this embodiment, stored information relating to a first selection executed on a mobile phone, e.g. the time of day that the first selection was executed, may determine at least in part the algorithm's usage of the stored data relating to the first selection.

The systems and methods of the invention may also include modifying multiple mobile phone settings. In this embodiment, one or more algorithms may control user behavior-based modification of the multiple mobile phone settings. The modification of the settings may occur simultaneously or at different times. The settings to be modified by the systems and methods of the invention may include default settings and/or default settings that have been modified by the systems and methods of the invention.

The mobile phone setting to be modified may be initially configured with a default setting. The algorithm may modify the default setting when information relating to at least one relevant selection executed by the user is stored in the mobile phone memory. A 'relevant selection' may be understood to refer to a selection stored in the mobile phone memory that may be used to modify the mobile phone setting.

In one embodiment of the systems and methods of the invention, the algorithm may not modify the default setting of the mobile phone setting until a predetermined number of relevant selections have been stored in the mobile phone memory. In an alternate embodiment, the mobile phone may not modify the default setting until the algorithm has determined a proposed default setting, the proposed default setting having obtained a predetermined level of accuracy in user behavior-based setting modification.

The mobile phone setting that may be modified by the systems and methods of the invention may relate to the mobile phone backlight. In this embodiment, the algorithm that controls at least the power level of the mobile phone backlight, hereinafter referred to as the 'backlight algorithm,' may be modified according to the systems and methods of the invention. For example, the backlight algorithm may modify the ON, OFF and/or dim setting of the mobile phone backlight. The backlight algorithm may also modify a reduced power mode of the mobile phone backlight, e.g. by illuminating only part of the mobile phone backlight. The backlight algorithm may also modify an elapse of time following a selection executed by the user. The elapse of time following the selection executed by the user may be a threshold value of time of user inaction that is followed by the automatic turning off of the backlight of the mobile phone.

The backlight algorithm may be further modified to turn the backlight off when a selection and/or a sequence of selections are executed on the mobile phone.

It should be noted that the backlight algorithm may be modified in any other suitable way according to the systems and methods of the invention. The examples set forth above are for illustrative purposes only and do not to limit the scope of the invention in any way.

The mobile phone setting that may be modified by the systems and methods of the invention may relate to a mobile phone function. The mobile phone function may be a hardware function. The hardware function may be a function with power control independent of other hardware functions. For example, the mobile phone function may be a Bluetooth controller, WiFi controller, LCD controller, touch screen sensor, flash device, display and/or RAM device.

The systems and methods of the invention may include modifying multiple mobile phone functions. One or more algorithms may be used to modify the multiple mobile phone functions.

In one embodiment of the invention, the power level of a mobile phone function may be modified by an algorithm that controls at least the power level of the mobile phone function, hereinafter the 'power level algorithm.'

The power level algorithm may modify the time span during which the mobile phone function is in a high power state. The power level algorithm may set the mobile phone function to a power state lower than the high power state upon an elapse of time of user inaction. The user inaction may relate to inaction with respect to the mobile phone function or one or more selections that may be executed on the mobile phone.

The power level algorithm may also set the mobile phone function to a power state lower than a high power state in the event of a selection and/or sequence of selections executed by the user.

It should be noted that the mobile phone function may be modified in any other suitable way according to the systems and methods of the invention. The examples mentioned are for illustrative purposes only and do not to limit the scope of the invention in any way.

The mobile phone setting that may be modified according to the systems and methods of the invention may additionally relate to the preloading of data and/or web pages. An algorithm that relates at least in part to the preloading of data and/or web pages may modify the data and/or web pages preloaded when a web page is displayed. The modification may be based at least in part on stored information relating to one or more selections the user has made relating to one or more links displayed on the web page and/or any other relevant selection.

The mobile phone setting to be modified according to the systems and methods of the invention may also relate to the order in which two or more menu options are displayed. The mobile phone setting to be modified according to the systems and methods of the invention may further relate to the spatial location and/or orientation of an icon, letter(s), words(s) and/or picture(s) displayed in the mobile phone.

It should be noted that the modification of the mobile phone setting may be executed via a software program. The software program may be implemented in the software of the mobile phone. The software of the mobile phone in which the software program may be implemented may be mobile phone software that controls the state of the mobile phone setting.

In one embodiment of the invention, the user may select one or more mobile phone settings he desires to be modified by the systems and methods of the invention. In this embodiment, modification of a mobile phone setting may be an option displayed on the mobile phone.

The systems and methods of the invention may also include displaying an option in the mobile phone. The option may relate to deactivating the algorithm used by the systems and methods of the invention in favor of a default setting.

The systems and methods of the invention may further include displaying an option to save a mobile phone setting that has been modified by the algorithm taught by the systems and methods of the invention. The execution of the selection to save the modified mobile phone setting may be followed by the deactivation of the algorithm used by the systems and methods of the invention. The saved setting may subsequently be used as the mobile phone setting. The algorithm used by the systems and methods of the invention may be reactivated upon the selection of a second designated option.

The algorithm taught by the systems and methods of the invention may be modified based at least in part on stored information. The stored information may include information relating to one or more selections executed on the mobile phone. In the event of a disparity arising between the algorithm and the user's current behavior, the algorithm may be further modified.

For example, an algorithm may have learned that a user rarely uses his phone following the completion of a call. The algorithm may have configured the mobile phone backlight to turn off following the completion of a call. Upon the occurrence of the user executing a selection following the completion of a call, the algorithm may modify the backlight to turn off upon the elapse of a predetermined length of time of user inaction following the completion of the call.

In the event of the algorithm differing from the user's behavior, the algorithm may be modified based at least in part on stored data relating to one or more relevant user selections. Alternatively, the algorithm may revert to a default setting. In one embodiment of the systems and methods of the invention, the algorithm may be replaced by the default setting when the algorithm differs from the user's behavior a predetermined number of times.

In the event of the algorithm accurately conforming to the user's behavior over a period of time defined by multiple occurrences of successfully predicted actions or inactions, the number of multiple occurrences surpassing a predetermined threshold, the algorithm may not be modified in the event of a single incorrect prediction. Rather, the algorithm that correctly predicted the user's behavior multiple times may be modified preferably in the event of multiple incorrect predictions. The number of multiple incorrect predictions may relate to the previous accuracy of the algorithm and/or the time span during which the algorithm had accurately predicted the user's behavior.

The systems and methods of the invention may include displaying one or more options that allow the user to modify the configuration of one or more mobile phone settings. For example, an option may be displayed that presents the user with an option to select a length of time that will elapse before the turning off of the backlight following one or more user selections. The systems and methods of the invention may also include displaying options that allow the user to modify the location of one or more icons and/or menu options displayed in the mobile phone.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

Figure 1:
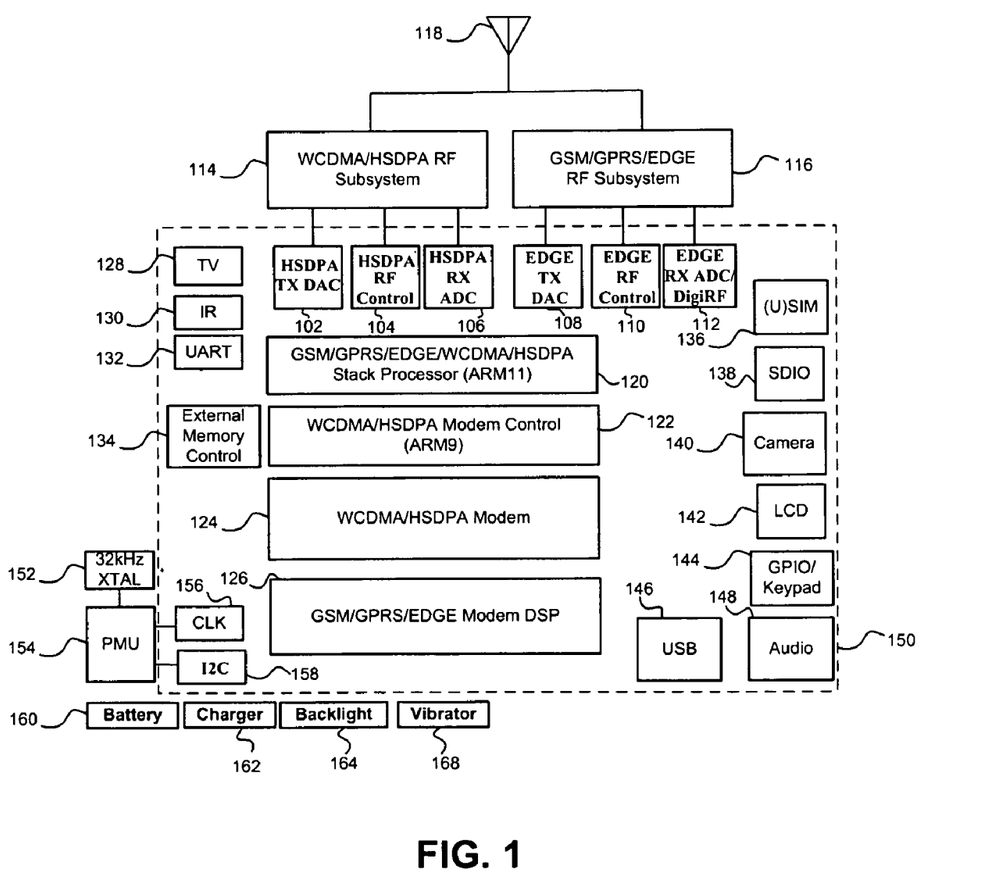
FIG. 1 shows a schematic diagram of a conventional cell phone.

FIG. 1 shows a schematic diagram of a cell phone 150 that could be used for systems and methods according to the invention. Cell phone 150 preferably include components HSDPA Transmitter DAC 102, HSDPA RF Control 104, HSDPA RX ADC 106, EDGE TX DAC 108, EDGE RF Control 110, and EDG RX ADC/DigiRF 112 (each of which forms a portion the hardware for converting the digital signal from the modem to an analogue RF signal for the antenna and vice-versa). WCDMA/HSDPA RF subsystem 114, GSM/GPRS/EDGE subsystem 116, and antenna 118 are for establishing a connection between the phone and the cell.

Components GSM/GPRS/EDGE/WCDMA/HSDPA Stack Processor (ARM11) 120 (which is the baseband processor for the phone), WCDMA/HSDPA Modem control (ARM9) 122, WCDMA/HSDPA Modem 124 and GSM/GPRS/EDGE Modem DSP 126 are the core processing logic and further contain relevant mobile phone communications protocols.

Finally, components TV 128, IR (Infrared) 130, UART (Universal Asynchronous Receiver/Transmitter—i.e., hardware that translates data between parallel and serial interfaces) external memory control 134, (U)SIM 136, SDIO (Secure Digital Input/Output (SDIO) is a standard for devices that feature interchangeable memory options) 138, camera 140, LCD 142, GPIO/Keypad 144, USB interface 146, and audio 148 are all for connections to phone peripherals. 32 kHz XTAL 152 (an oscillator that uses a quartz crystal to generate a frequency) is coupled to PMU (Power Management Unit) which is, in turn, coupled to CLK (Clock) 156 and I2C Bus 158. Furthermore, battery 160, charger 162, backlight 164, and vibrator 168 (or other tactile feedback) are shown schematically for further illustration.

Figure 2:
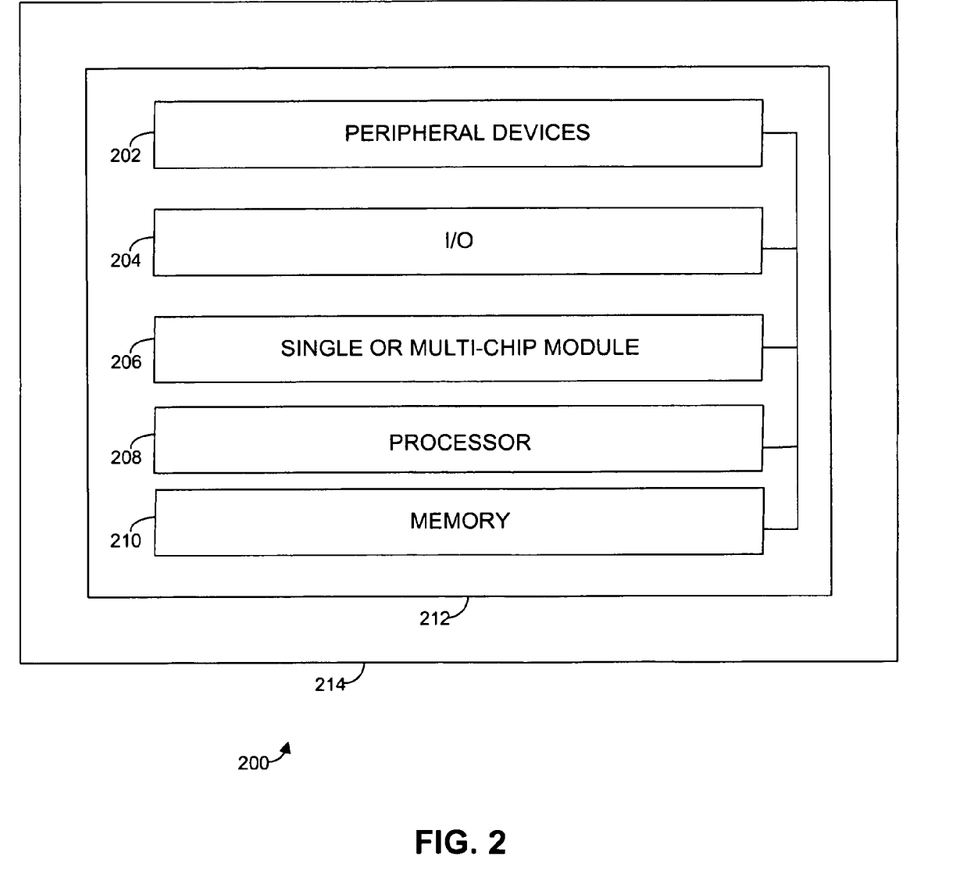
FIG. 2 shows an illustrative data processing system for use with methods according to the invention.

FIG. 2 shows a single or multi-chip module 202 according to the invention, which can be one or more integrated circuits, in an illustrative data processing system 200 according to the invention. Data processing system 200 may include one or more of the following components: I/O circuitry 204, peripheral devices 206, a processor 208 and memory 210. These components are coupled together by a system bus or other interconnections 212 and are populated on a circuit board 214 which is contained in an end-user system 230. System 200 is configured for use in a mobile phone according to the invention. It should be noted that system 200 is only exemplary, and that the true scope and spirit of the invention should be indicated by the following claims.

Figure 3:
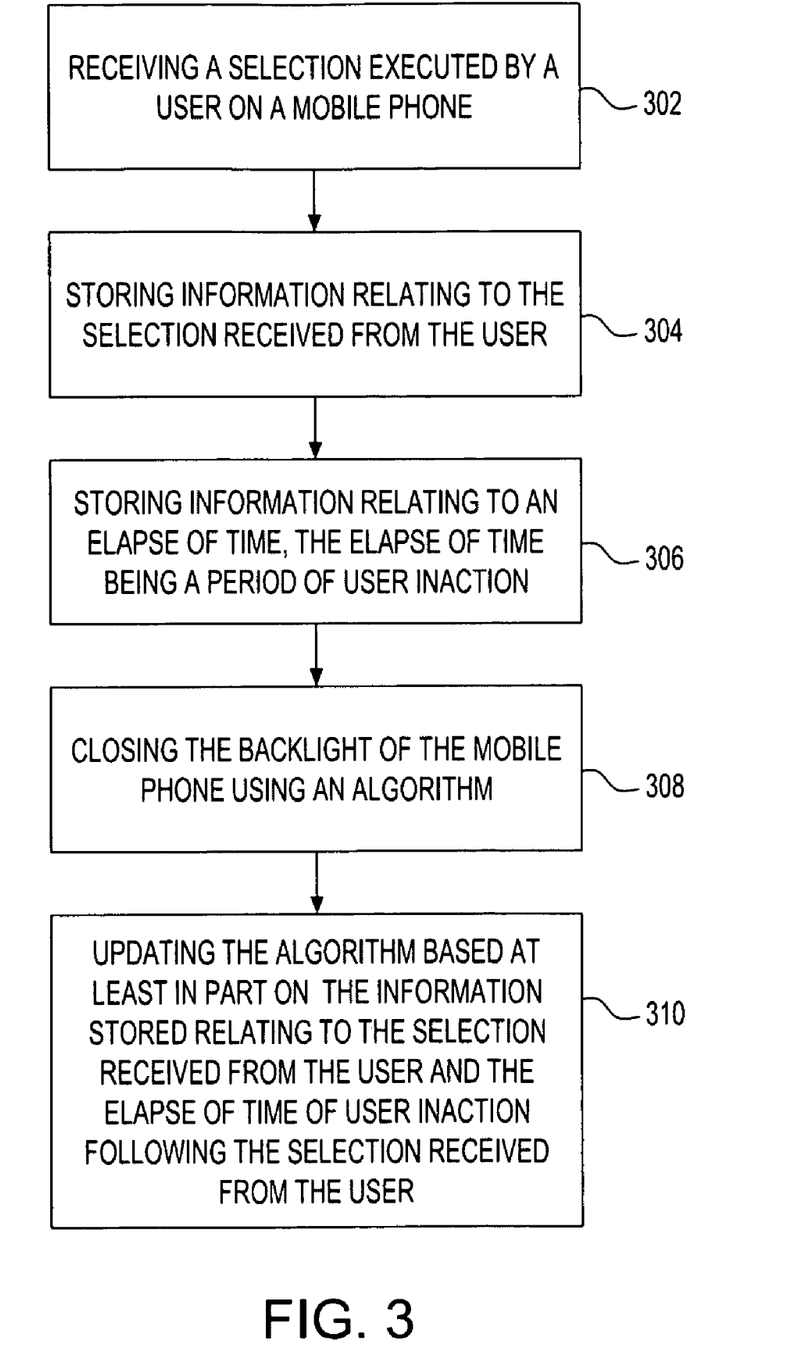
FIG. 3 shows an illustrative flow diagram of a process according to the systems and methods of the invention.

FIG. 3 shows an illustrative flow diagram according to the systems and methods of the invention. A selection executed by a user on a mobile phone may be received in step 302. In step 304, information may be stored relating to the selection received from the user. In step 306, information may be stored relating to an elapse of time, the elapse of time being further characterized by a period of user inaction. In step 308 the backlight of the mobile phone may be turned off using an algorithm. The algorithm may be updated based at least in part in step 310. The algorithm may be updated based at least in part on the information stored relating to the selection received from the user and the elapse of time of user inaction following the selection received from the user.

FIGS. 4-7 show illustrative diagrams that describe processes according to the systems and methods of the invention.

FIGS. 4-7 illustrate two embodiments of the elapsed time that a mobile phone backlight may be on. In the first embodiment, a first algorithm controls the ON-OFF power setting of the mobile phone backlight. The first algorithm may be an algorithm which represents a conventional default algorithm. The time that the first embodiment configures the backlight of the mobile phone in an ON setting is represented by a dashed line. In the second embodiment, a second algorithm controls the ON-OFF power setting of the mobile phone backlight. The second algorithm may be an algorithm according to the invention that has learned a user's behavior. The time that the second embodiment configures the backlight of the mobile phone in an ON setting is represented by a solid black line.

In FIGS. 4-7, time runs along the x-axis. It should be noted that the progression of time along the x axis in FIGS. 4-7 may not be linear.

Figure 4:
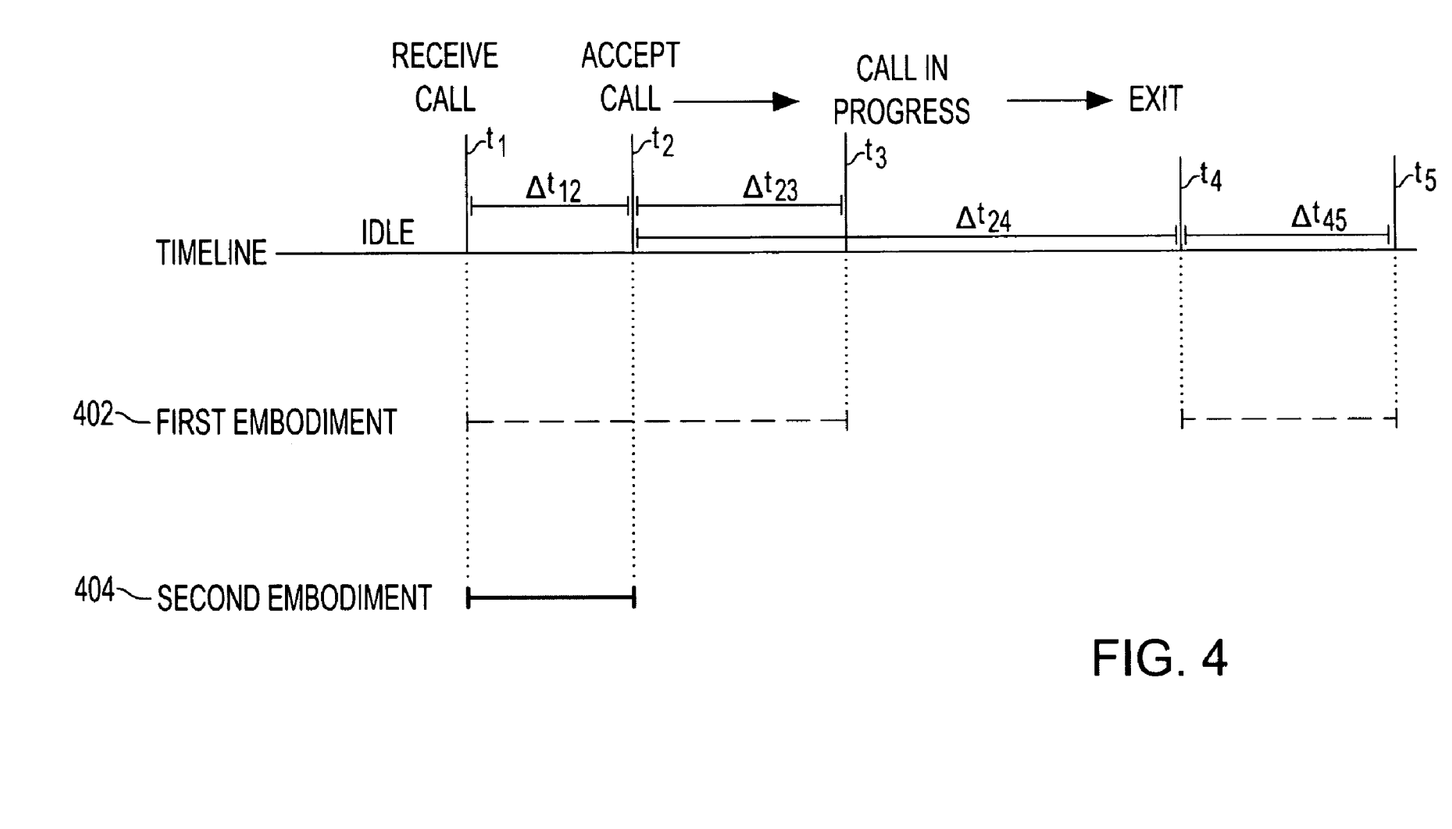
FIG. 4 shows an illustrative diagram of a process for accepting a call on a mobile phone.

FIG. 4 shows an illustrative diagram of two embodiments of processes for accepting a call on a mobile phone.

First embodiment 402 represents a conventional default operation of a mobile phone backlight. A user may receive a call at point in time $t_1$. A first algorithm which controls default backlight operation in first embodiment 402 may turn ON the mobile phone backlight when the user receives the call. The user may accept the call at point in time $t_2$. The call may be in progress during the elapse of time $\Delta t_{24}$. The backlight of the mobile phone may turn OFF following the elapse of a first default length of time at point in time $t_3$ (which may occur during the time the call is in progress $\Delta t_{24}$). The user may exit (i.e. hang-up or otherwise terminate) the call at point in time $t_4$. When the user has executed the selection to exit the call, the first algorithm may turn ON the mobile phone backlight. The first algorithm may turn OFF the mobile phone backlight upon the elapse of a second default length of time at point in time $t_5$.

A second embodiment 404 illustrates a process according to the invention for using learned information about a user's behavior to change backlight settings. The learning portion of the process is not shown in FIG. 4, but rather only the implementation of learned user tendencies.

Second embodiment 404 may include a user receiving a call at point in time $t_1$. A second algorithm which controls backlight operation in second embodiment 404 may turn ON the mobile phone backlight when the user receives the call. The user may accept the call at point in time $t_2$. The second algorithm may turn OFF the mobile phone backlight when the user accepts the call. The call may be in progress during the elapse of time $\Delta t_{24}$. The backlight may remain OFF during substantially the entire time that the user is on the call during the elapse of time $\Delta t_{24}$. The user may exit the call at point in time $t_4$.

FIG. 4 illustrates an exemplary embodiment of the power saved when the second algorithm controls the mobile phone backlight setting compared to the first algorithm. The second algorithm configured the mobile phone backlight in an ON setting for a length of time $\Delta t_{23}+\Delta t_{45}$ shorter than the first algorithm.

Figure 5:
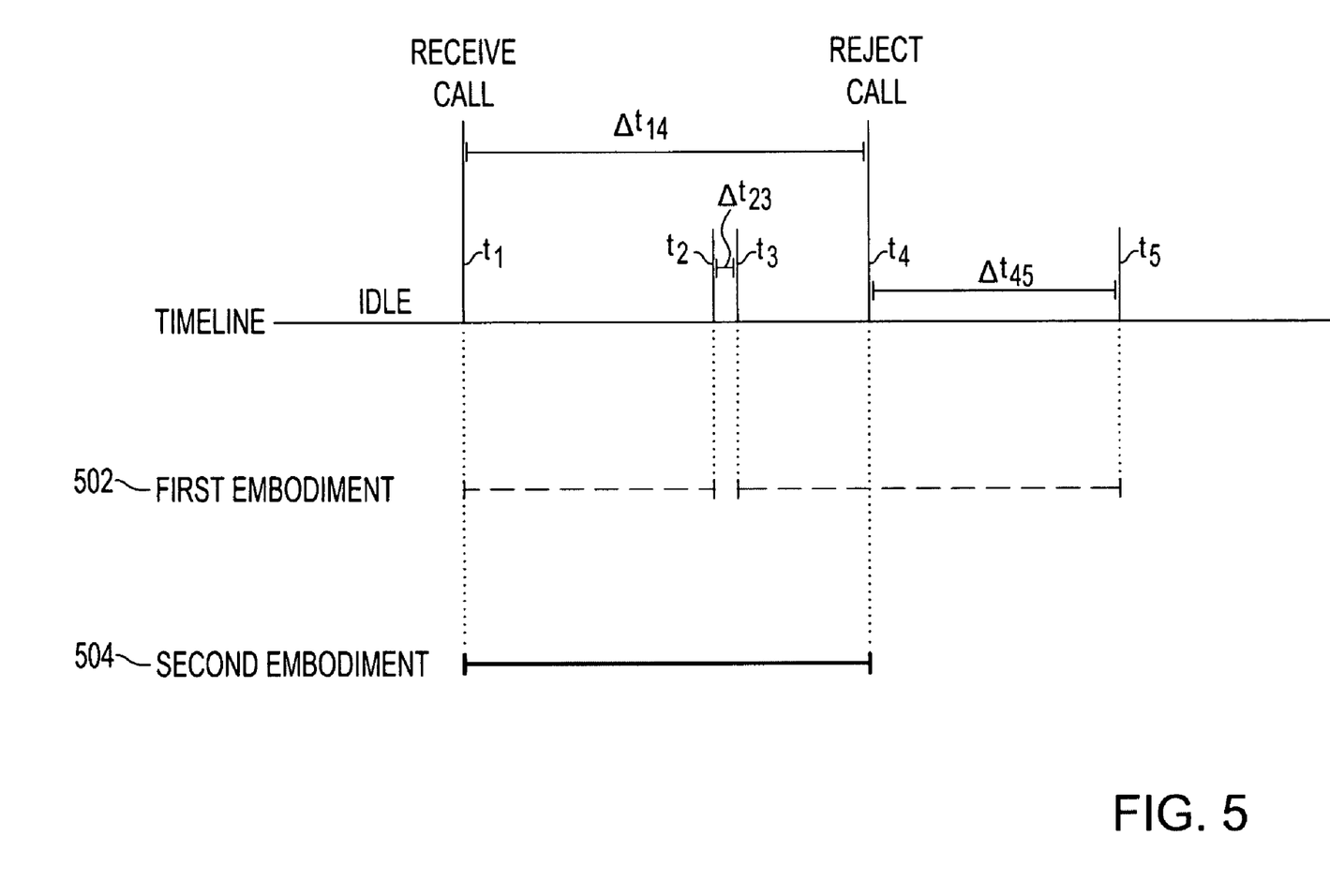
FIG. 5 shows an illustrative diagram of a process for rejecting a call on a mobile phone.

FIG. 5 shows an illustrative diagram of a process for configuring a backlight setting when a user rejects a call on a mobile phone.

First embodiment 502 represents conventional default operation for a user rejecting an incoming call. The user may receive a call at point in time $t_1$. A first algorithm which controls backlight operation in first embodiment 502 may turn the mobile phone backlight ON when the user receives the call. The first algorithm may turn OFF the mobile phone backlight upon the elapse of a first default length of time at point in time $t_2$. The user may execute a selection to turn ON the mobile phone backlight at point in time $t_3$. The user may reject the received call at point in time $t_4$. The first algorithm may turn OFF the mobile phone backlight upon the elapse of a second predetermined length of time at point in time $t_5$.

A second embodiment 504 shows another process according to the invention for using learned information about a user's tendencies to change backlight settings. The learning portion of the process is not shown in FIG. 5, but rather only the implementation of learned user tendencies.

Second embodiment 504 may include a user receiving a call at point in time $t_1$. A second algorithm which controls backlight operation in second embodiment 504 may turn ON the mobile phone backlight when the user receives the call. The user may reject the call at point in time $t_4$. The second algorithm may turn OFF the backlight upon the users' rejection of the call.

FIG. 5 illustrates an exemplary embodiment of the power saved when the second algorithm controls the mobile phone backlight setting compared to the first algorithm. The second algorithm configured the mobile phone backlight in an ON setting for a length of time $\Delta t_{45}-\Delta t_{23}$ shorter than the first algorithm.

Figure 6:
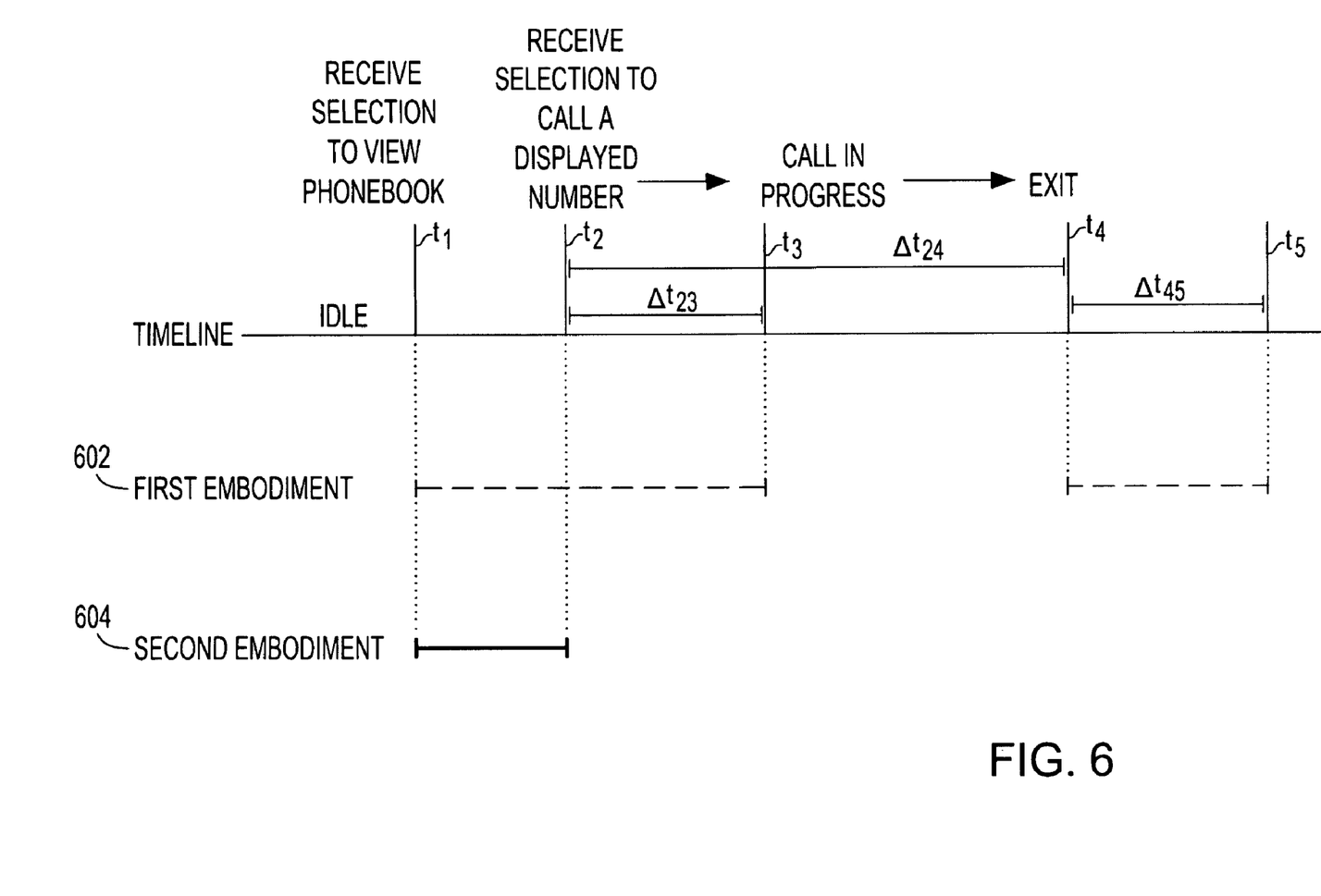
FIG. 6 shows an illustrative diagram of a process executed on a mobile phone.

FIG. 6 shows an illustrative diagram of another process executed on a mobile phone.

First embodiment 602 relates to using a conventional process for using an electronic phonebook on a mobile phone. A user may select to view the electronic phone book contained in the mobile phone at point in time $t_1$. A first algorithm which controls backlight operation in first embodiment 602 may turn ON a mobile phone backlight upon the user's selection to view the electronic phone book. The user may select to call a displayed number at point in time $t_2$. The call may be in progress during the duration of time $\Delta t_{24}$. The first algorithm may turn OFF the mobile phone backlight upon the elapse of a first default length of time at point in time $t_3$. The user may select to exit the call at point in time $t_4$. The first algorithm may turn ON the mobile phone backlight upon the user's selection to exit the call. The first algorithm may turn OFF the backlight upon the elapse of a second default length of time at point in time $t_5$.

A second embodiment 604 illustrates yet another process according to the invention for using learned information about a user's behavior to change backlight settings. The learning portion of the process is not shown in FIG. 6, but rather only the implementation of learned user tendencies.

Second embodiment 604 may include a user selecting to view an electronic phone book contained in the mobile phone at point in time $t_1$. A second algorithm which controls backlight operation in second embodiment 604 may turn ON a mobile phone backlight upon the user's selection to view the electronic phone book. The user may select to call a displayed number at point in time $t_2$. The second algorithm may turn OFF the mobile phone backlight upon the user's selection to call the displayed number. The call may be in progress during the duration of time $\Delta t_{24}$. The second algorithm may maintain the backlight in an OFF setting for the duration of the call. As such, the backlight is OFF during the second embodiment for $\Delta t_{24}$. Alternately, second embodiment 604 may turn OFF the backlight at some point later than point in time $t_2$. The user may select to exit the call at point in time $t_4$.

FIG. 6 illustrates an exemplary embodiment of the power saved when the second algorithm controls the mobile phone backlight setting compared to the first algorithm. The second algorithm configured the mobile phone backlight in an on setting for a length of time $\Delta t_{23}+\Delta t_{45}$ shorter than the first algorithm.

Figure 7:
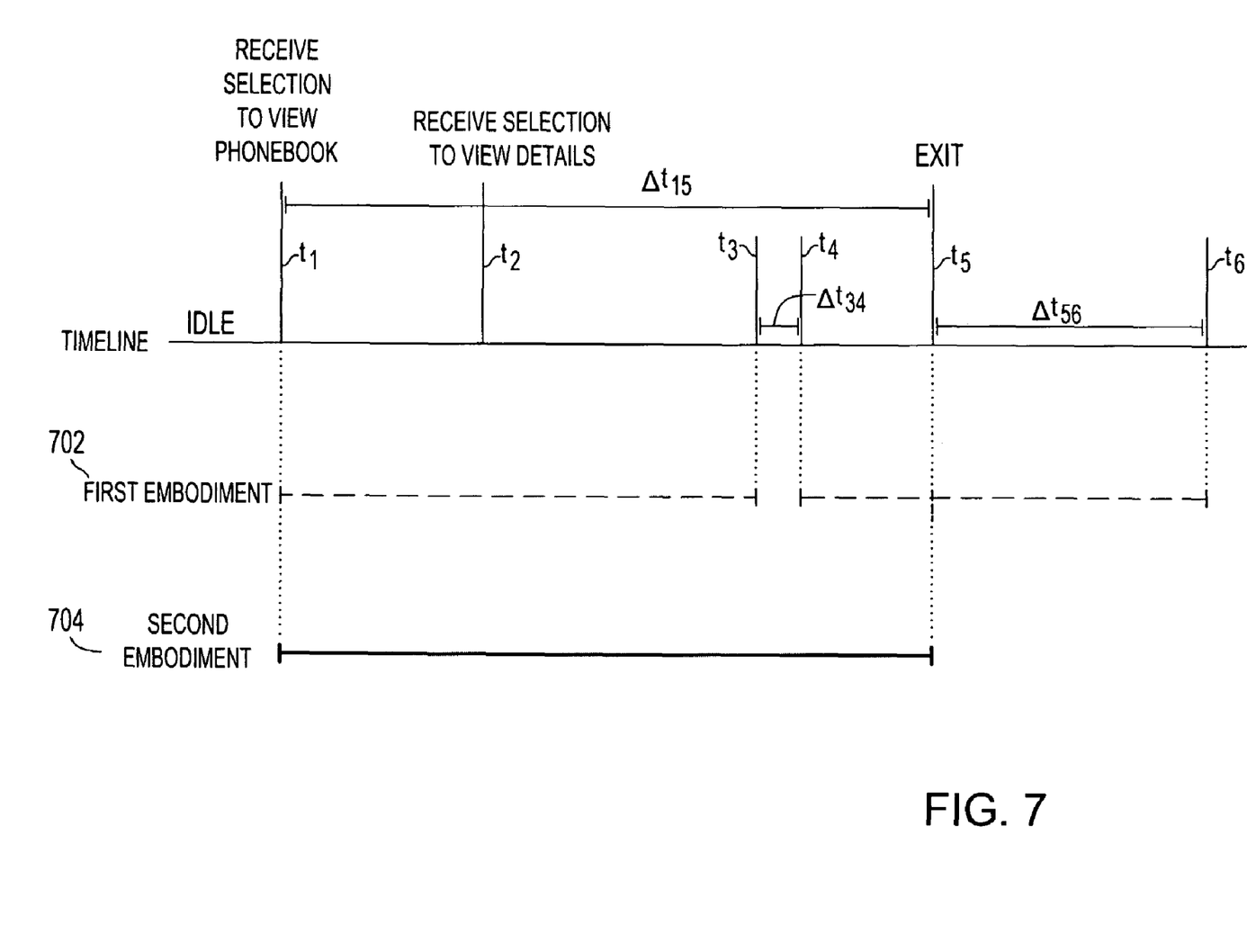
FIG. 7 shows an illustrative diagram of another process executed on a mobile phone.

FIG. 7 shows an illustrative diagram of yet another process executed on a mobile phone. First embodiments 702 and 704 shown in FIG. 7 relate further to use of an electronic phonebook implemented in a mobile phone.

First embodiment 702 represents conventional default operation of a mobile phone backlight. A user may select to view an electronic phone book contained in the mobile phone at point in time $t_1$. A first algorithm which controls backlight operation in first embodiment 702 may turn ON a mobile phone backlight when the user selects to view the electronic phone book. The user may select to view details of the electronic phone book at point in time $t_2$. The first algorithm may turn OFF the mobile phone backlight upon the elapse of a first default length of time at point in time $t_3$. The user may execute a selection to turn ON the backlight at point in time $t_4$. The user may execute a selection to exit the electronic phonebook at point in time $t_5$. The first algorithm may turn OFF the mobile phone backlight upon the elapse of a second default length of time at point in time $t_6$.

A second embodiment 704 illustrates yet another process according to the invention for using learned information about a user's behavior to change backlight settings. The learning portion of the process is not shown in FIG. 7, but rather only the implementation of learned user tendencies.

Second embodiment 704 may include a user selecting to view an electronic phone book contained in the mobile phone at point in time $t_1$. A second algorithm which controls backlight operation in second embodiment 704 may turn ON a mobile phone backlight when the user selects to view the electronic phonebook. The user may select to view details of the electronic phonebook at point in time $t_2$. The user may select to exit the electronic phone book at point in time $t_5$. The second algorithm may turn OFF the mobile phone backlight when the user selects to exit the phonebook at time $t_5$. The second algorithm may maintain the backlight in an ON setting for $\Delta t_{15}$.

FIG. 7 illustrates an exemplary embodiment of the power saved when the second algorithm controls the mobile phone backlight setting compared to the first algorithm. The second algorithm configured the mobile phone backlight in an ON setting for a length of time $\Delta t_{56}-\Delta t_{34}$ shorter than the first algorithm.

The two embodiments illustrated in each of FIGS. 4-7 are preferably not executed simultaneously on a mobile phone. Embodiments one and two have been represented in the same FIGS. for comparative purposes only.

Aspects of the invention have been described in terms of illustrative embodiments thereof. A person having ordinary skill in the art will appreciate that numerous additional embodiments, modifications, and variations may exist that remain within the scope and spirit of the appended claims. For example, one of ordinary skill in the art will appreciate that the steps illustrated in the figures may be performed in other than the recited order and that one or more steps illustrated may be optional.

Thus, systems and methods for reducing power consumption of a mobile phone by usage learning have been described. Persons skilled in the art will appreciate that the present invention can be practiced by other than the described embodiments, which are presented for purposes of illustration rather than of limitation, and the present invention is limited only by the claims which follow.

What is claimed is:

1. A method for controlling the operation of a mobile phone backlight, the method comprising:
    receiving an incoming call;
    receiving a selection from a user in response to receiving the incoming call;
    storing information relating to the selection received from the user;
    turning off the mobile phone backlight after the passing of a predetermined time span of user inaction, the passing of the predetermined time span following the selection received from the user, the length of the predetermined time span having been determined at least in part using an algorithm; and
    modifying the algorithm based at least in part on the stored information; wherein:
        the predetermined time span is different from a default time span.

2. The method of claim 1 wherein the selection received from the user is a selection to accept the call.

3. The method of claim 1 wherein the selection received from the user is a selection to reject the call.

4. The method of claim 1 wherein the stored information includes information relating to the time of day that the selection was received from the user.

5. The method of claim 1 wherein the stored information includes information relating to whether the mobile phone was roaming or not when the selection was received from the user.

6. The method of claim 1 wherein the stored information includes information relating to the day of the week that the selection was received from the user.

7. The method of claim 1 further comprising storing information relating to a length of time of user inaction following the selection received from the user.

8. The method of claim 7 further comprising modifying the algorithm based at least in part on stored information relating to the length of time of user inaction following the selection received from the user.

9. The method of claim 1 wherein the algorithm determines the length of time that elapses before shutting off the backlight of the mobile phone in the event of a future selection received from the user pertaining to an incoming call.

10. The method of claim 1 wherein the algorithm is determined using statistics.

11. The method of claim 10 wherein the statistics include at least one prior selection received from the user relating to an incoming call.

12. The method of claim 10 wherein the statistics are Bayesian statistics.

13. A mobile phone comprising:
a memory;
a backlight; and
a processor, wherein said processor is operative to store information in said memory corresponding to a first mobile phone selection received from a user, the processor modifying a period of time that the backlight will remain on following a second user selection;
wherein:
said first mobile hone selection is selected from a group consisting of user selections relating to:
ending a call;
accepting a call;
rejecting a call;
turning the mobile phone on;
turning the mobile phone off;
turning the mobile phone speaker on;
turning the mobile phone speaker off;
moving a mobile phone curser;
selecting a menu option; or
selecting an icon; and
said modification is based at least in part on said stored information and is different from a default time span.

14. The mobile phone of claim 13 wherein the stored information includes information relating to the day of the week that the first selection was received from the user.

15. The mobile phone of claim 13 wherein the modifying of the mobile phone backlight further includes modifying a period of time that the backlight remains in a high power state following the second user selection.

16. The mobile phone of claim 13 wherein the stored information includes information relating to the time of day that the first selection was received from the user.

17. The mobile phone of claim 13 wherein the stored information includes information relating to whether the mobile phone was roaming or not when the first selection was received from the user.

18. The mobile phone of claim 13 wherein the processor uses an algorithm to modify the period of time that the backlight remains on following the second user selection.

19. The mobile phone of claim 18 wherein the algorithm is a statistical algorithm.

20. The mobile phone of claim 18 wherein the algorithm is a learning algorithm.

21. The mobile phone of claim 18 wherein the algorithm is determined using statistics.

22. The mobile phone of claim 21 wherein the statistics are Bayesian statistics.

23. The mobile phone of claim 13 further comprising storing information relating to a length of time of user inaction following the first selection received from the user.

24. The mobile phone of claim 23 wherein the algorithm is modified based at least in part on the stored information relating to the length of time of user inaction following the first selection received from the user.

25. A method for configuring a power setting of a mobile phone function, the method comprising:
storing information relating to a selection executed by a user, the selection relating to the mobile phone function;
storing information relating to a length of time following the selection executed by the user, the length of time being a period of inaction of the mobile phone function, the length of time being smaller than a default value; and
electronically setting the mobile phone function to a low power state upon the occurrence of a predetermined event, the predetermined event having been determined at least in part using an algorithm, the algorithm having included the stored information relating to the selection executed by the user and the period of inaction following the user selection.

26. The method of claim 25 wherein the predetermined event is the usage of a mobile phone function different from said mobile phone function.

27. The method of claim 25 wherein the mobile phone function is a hardware function.

28. The method of claim 25 wherein the mobile phone function is a function with power control independent from the power control of other mobile phone functions.

29. The method of claim 25 wherein the information stored includes the time of day during which the selection was received from the user.

30. The method of claim 25 wherein the predetermined event is the passing of a predetermined time span.

31. The method of claim 30 wherein the predetermined time span is a time span of user inaction with respect to the mobile phone function.

32. One or more non-transitory computer-readable media storing computer-executable instructions which, when executed by a processor on a computer system, perform a method for configuring a software function of a mobile phone, the software function relating to the preloading of web pages, the method comprising:
receiving a selection from a user to view a webpage;
storing information relating to the selection received from the user;
preloading links from the selected webpage, the preloaded links being different from default links, the preloaded links being determined at least in part using an algorithm; and
modifying the algorithm based at least in part on the stored information.

33. The method of claim 32 further comprising receiving information relating to a link selected by the user, the link being displayed on the selected webpage.

34. The method of claim 33 further comprising storing information relating to the sclected link.

* * * * *